United States Patent [19]
Dietz

[11] 3,946,274
[45] Mar. 23, 1976

[54] SIDE PINCUSHION CORRECTION CIRCUIT

[75] Inventor: Wolfgang Friedrich Wilhelm Dietz, New Hope, Pa.

[73] Assignee: RCA Corporation, New York, N.Y.

[22] Filed: Apr. 18, 1974

[21] Appl. No.: 462,058

[52] U.S. Cl. ............................ 315/371; 315/411
[51] Int. Cl.² ...................................... H01J 29/56
[58] Field of Search ............ 315/370, 371, 411, 400

[56] References Cited
UNITED STATES PATENTS

| | | | |
|---|---|---|---|
| 3,571,653 | 3/1971 | Hansen et al. | 315/370 |
| 3,648,099 | 3/1972 | Otten et al. | 315/371 |
| 3,700,958 | 10/1972 | Haferl | 315/371 |

Primary Examiner—Richard A. Farley
Assistant Examiner—T. M. Blum
Attorney, Agent, or Firm—E. M. Whitacre; Paul J. Rasmussen

[57] ABSTRACT

Horizontal rate energy obtained from a winding of the horizontal output transformer of a deflection system is rectified for providing operating current for the vertical deflection output stage. A variable impedance is in shunt with a coil which is in series with a rectifier coupled to the transformer winding. The impedance is controlled by a parabolic vertical rate waveform to alter the charging rate of a storage capacitor coupled to the rectifier for supplying the vertical operating current. The parabolically varying rectifier current alters the loading of the horizontal transformer and thereby alters the horizontal scanning current at a vertical rate in a manner to correct for side pincushion distortion.

7 Claims, 1 Drawing Figure

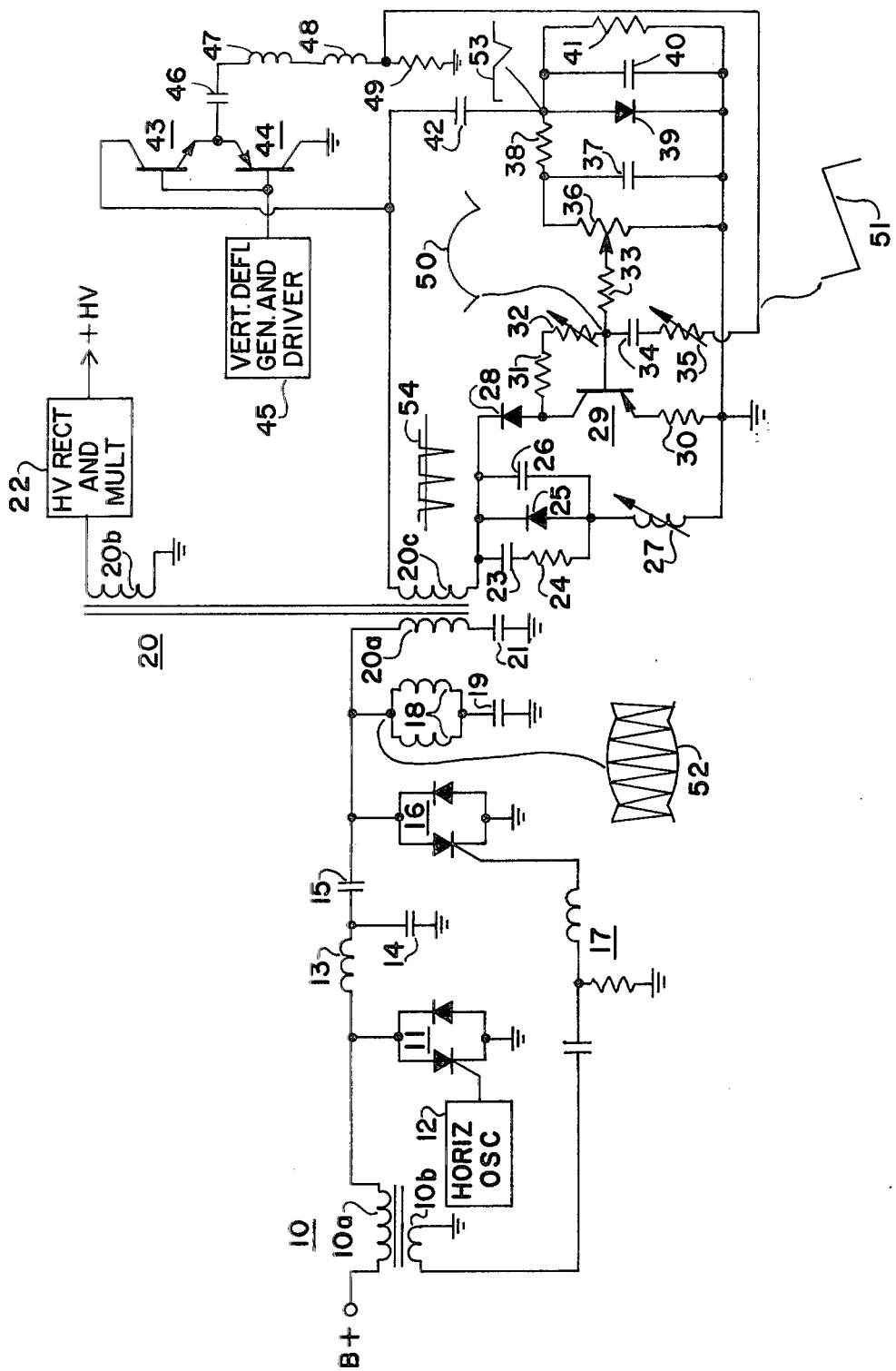

SIDE PINCUSHION CORRECTION CIRCUIT

BACKGROUND OF THE INVENTION

This invention relates to a side pincushion correction circuit for use in display systems such as television systems.

It is well recognized that the geometrical relationship of the scanning beam or beams of a cathode ray tube to the inside surface of the viewing screen over which they are scanned causes a raster distortion known as pincushion distortion. This distortion is characterized by a widening of the display in a horizontal direction at the top and bottom of the raster relative to the center of the raster. It is also well recognized that in many situations this distortion can be corrected by modulating the horizontal scanning current at the vertical deflection scanning rate. Frequently the modulation is in parabolic form, causing a maximum decrease in horizontal scanning current at the top and bottom of the raster, corresponding to the beginning and end portions of the vertical trace interval, relative to the horizontal scanning current at the center of the raster.

The vertical rate modulation may be impressed upon the horizontal scanning current in a number of ways. A reactor may be placed in circuit with the horizontal deflection coils and controlled to vary the impedance to horizontal scanning current at the vertical rate. A transformer in circuit with the horizontal deflection coils may also be utilized to achieve the required modulation. A more recent approach is to rectify horizontal rate energy, such as that obtained from a winding of the horizontal output transformer, and utilize the rectified current for supplying the vertical deflection output stage. The vertical stage itself then loads the horizontal winding such that the horizontal scanning current is modulated at the vertical deflection rate. While this arrangement is satisfactory, it would be desirable to provide a raster correction circuit which offers a greater degree of control over the modulation.

In accordance with the invention, a raster correction circuit includes a line frequency generator and a line frequency output transformer and deflection winding coupled to the line frequency generator. Power supply means including rectifying means are coupled to a winding of the transformer for rectifying line rate energy obtained from the winding. A field rate generator is coupled to the power supply means for obtaining operating current therefrom. Active current conductive means are coupled in circuit with the rectifying means and are responsive to signals derived from the field frequency generator for providing a variable impedance path for varying the current in the rectifying means at a field deflection rate for loading the transformer and varying line rate current in the deflection winding in a manner to correct for raster distortion.

A more detailed description of the invention is given in the following specification and the sole FIGURE in the accompanying drawing showing a raster correction circuit in accordance with one embodiment of the invention.

DETAILED DESCRIPTION OF THE INVENTION

In the FIGURE, which shows a horizontal deflection system including a raster correction circuit in accordance with the invention, a winding 10a of an input reactance 10 is coupled between a source of voltage B+ and one terminal of a bidirectionally conducting switch 11. Winding 10a is also coupled to a commutating coil 13 and a capacitor 15 to one terminal of a second bidirectionally conducting switch 16. An auxiliary capacitor 14 is coupled between commutating coil 13 and capacitor 15 and ground. Switch 16 is also coupled through horizontal deflection windings 18 and S-shaping capacitor 19 to ground and through a primary winding 20a of a horizontal output transformer 20 and a blocking capacitor 21 to ground. A horizontal oscillator 12 is coupled to the gate electrode of one of the elements of switch 11. A winding 10b of input reactor 10 is coupled through a waveshaping network 17 to provide gating signals for one element of switch 16. The circuit described thus far is a horizontal deflection circuit of the retrace driven SCR type described in U.S. Pat. No. 3,452,244. Since a description of the operation of this circuit is unnecessary for an understanding of the invention, it will suffice to say that the horizontal deflection circuit induces a scanning current through the horizontal deflection coils 18 and induces horizontal rate energy into the primary winding 20a of the horizontal output transformer 20. The horizontal energy comprises a relatively short retrace portion and a trace interval portion.

A winding 20b of horizontal output transformer 20 supplies horizontal retrace pulses to a conventional high voltage rectifier and multiplier 22 for producing a positive high voltage in the order of 25,000 volts for energizing the ultor terminal of a television picture tube.

The remainder of the circuit in the FIGURE includes the circuit in accordance with the invention for providing pincushion distortion correction to the horizontal scanning current.

A winding 20c of transformer 20 is coupled through the parallel combination of a series connected capacitor 23 and resistor 24, a diode 25 poled as indicated, and a capacitor 26 and through a variable inductance 27 to ground. The same terminal of winding 20c is also coupled through a diode 28 poled as indicated and the collector-emitter path of a transistor 29 through a current limiting resistor 30 to ground. A biasing network comprising a resistor 31 and a potentiometer 32 is coupled between the collector and base electrodes of transistor 29.

The other terminal of winding 20c is coupled through the series connected collector-emitter paths of transistors 43 and 44. Transistors 43 and 44 comprise the output stage of a vertical deflection amplifier. The complementary symmetry output stage is driven by a conventional vertical deflection generator and driver 45. The vertical rate deflection current is coupled through a DC blocking capacitor 46 through vertical deflection coils 47 and 48 and through a current sampling feedback resistor 49 to ground.

The top terminal of winding 20c is also coupled to one terminal of a storage capacitor 42, the other terminal of which is coupled through the parallel combination of a diode 39, a capacitor 40 and a resistor 41 to ground. This terminal of capacitor 42 is also coupled through a resistor 38 and the parallel combination of a capacitor 37 and a variable resistor 36 to ground. The tap of variable resistor 36 is connected through a resistor 33 to the base electrode of transistor 29. A phase shifting network comprising series connected capacitor 34 and potentiometer 35 is coupled between the base electrode of transistor 29 and the junction of feedback resistor 49 and vertical deflection winding 48.

In operation, diode 25, inductance 27, capacitor 42, and diode 39 act as a rectifying and storage means for the horizontal rate energy in winding 20c. The horizontal rate energy is illustrated by the waveform 54. Diode 25 is poled to rectify the trace portion of waveform 54. The rectified current charges and is stored in capacitor 42. Diode 39 prevents the accumulation of positive charge at the bottom terminal of capacitor 42. Capacitor 26 acts as an RF bypass capacitor for rectifier 25. Capacitor 23 and resistor 24 serve as damping elements to prevent oscillation in the circuit. Diode 28 serves to block any positive voltage from the collector of PNP transistor 29. Capacitor 34 and resistor 35 form a phase shifting network which serves to differentiate waveform 51 which is developed across sampling resistor 49 for purposes to be described subsequently. It is noted that a waveform 53 at the vertical deflection rate is developed at the junction of capacitor 42 and diode 39. This waveform is indicative of when vertical output transistor 43 conducts during the latter half of each vertical trace interval. The network comprising capacitor 37, resistor 38, capacitor 40 and resistor 41 comprises an integrating circuit for forming a parabola 50 from the waveform 53. This parabola is coupled through resistor 33 to the base of transistor 29. The adjustment of variable resistor 36 determines the amplitude of the parabola 50 applied to the base of transistor 29.

Transistor 29 and its associated control circuitry acts as a variable impedance in shunt with rectifier 25 and inductance 27 to shunt some of the rectifier current such that the rectifier 25 current is made to vary in a parabolic fashion at the vertical deflection rate. The parabola 50, coupled to the base of transistor 29, enables it to conduct most heavily at the beginning and ends of the vertical trace interval indicated by the more negative portions of waveform 50. During the portions of the vertical interval when transistor 29 conducts the most, a lower impedance is presented to the horizontal rate current as inductance 27 which presents a relatively high impedance to the horizontal rate energy is bypassed. This causes a faster charging current to flow into and charge capacitor 42. This faster charging current exists at the top and bottom of the raster and results in a horizontal scanning current envelope, as illustrated by the waveform 52. The modulation envelope of waveform 52 is at the vertical deflection rate and it can be seen that the amplitude of the horizontal scanning current is less in those portions representing the top and bottom of the scanned raster relative to the middle. Thus, side pincushion distortion is corrected by parabolically varying the horizontal scanning current at the vertical deflection rate. Inductance 27 also adjusts the vertical supply voltage.

The purpose of the phase shift network comprising resistor 35 and capacitor 34 is to differentiate the negative going portion of vertical rate sawtooth waveform 51 to add it to the parabola 50 to achieve a variable control on the amount of correction for the top portion of the raster. Variation of potentiometer 35 accomplishes this top and variable correction function.

It is noted that in the absense of transistor 29 and its associated circuitry, a relatively small amount of parabolic vertical rate correction to the horizontal energy would be accomplished by the charging and discharging of storage capacitor 42. However, the addition of shunt transistor 29 and its associated circuitry which effectively shunts the relatively high impedance 27 provides a much greater degree of vertical rate modulation of the horizontal energy. Furthermore, with the addition of the shunt path including transistor 29, it is the actual amount of rectifier current which is controlled in a parabolic manner. The loading of the winding 20c at the vertical deflection rate is reflected to winding 20a and causes more of the commutating current to be diverted to transformer 20 instead of through deflection windings 18 to S-shaping and storage capacitor 19 during the commutating portion of each horizontal deflection cycle.

While a particular arrangement has been described above, it should be understood that numerous variations of the described embodiment are readily achieved. For example, retrace rectification instead of trace rectification could be achieved by reversing winding 20c. Furthermore, any other suitable deflection circuit other than the SCR type described could also be used. Furthermore, the vertical deflection circuit need not be of the complementary symmetry type, but could be any other suitable type as well.

It should be noted that as an alternative embodiment, the cathode of diode 28 may be connected to the anode of diode 25 instead of the cathode of diode 25, and similarly shunt inductance 27 and thereby control the current through rectifier diode 25.

The following is a table of values of the circuit elements in the raster correction portion of the FIGURE:

| C23 | — | .0022 µf. | R24 | — | 220 ohms |
| C26 | — | 560 pf. | R30 | — | 1 ohm |
| C34 | — | 1.5 µf. | R31 | — | 1.5 Kohm |
| C37 | — | 350 µf. | R32 | — | 1 Kohm |
| C40 | — | 100 µf. | R33 | — | 120 ohms |
| C42 | — | 1000 µf. | R35 | — | 1 Kohm |
| | | | R36 | — | 100 ohms |
| | | | R38 | — | 27 ohms |
| | | | R41 | — | 2.4 ohms |
| L27 | — | 250–300 µh. | | | |
| Q29 | — | 2N6111 | | | |

What is claimed is:
1. A raster correction circuit comprising:
   a line frequency generator;
   a line frequency deflection winding coupled to said line frequency generator;
   a line frequency output transformer coupled to said line frequency generator;
   power supply means including rectifying means coupled to a winding of said line frequency output transformer for producing a direct current voltage from line rate energy in said winding;
   a field frequency generator coupled to said rectifying means for obtaining operating current therefrom; and
   active current conducting means coupled in circuit with said rectifying means and responsive to signals derived from said field frequency generator for providing a variable impedance path for current in said rectifying means at a field deflection rate for loading said transformer and varying line rate current in said deflection winding in a manner to correct for raster distortion.

2. A raster correction circuit comprising:
   a line frequency generator;
   a line frequency deflection winding coupled to said line frequency generator;
   a line frequency output transformer coupled to said line frequency generator;

power supply means including rectifying means and impedance means coupled in circuit with said winding for rectifying line rate energy in said winding;

a field frequency generator coupled to said power supply means for obtaining operating current therefrom; and control means including active current conducting means coupled in circuit with said impedance means and responsive to signals derived from said field frequency generator for providing a variable impedance path for current in said impedance means for altering current in said rectifying means at said field frequency rate for loading said winding and thereby altering said line rate current in said deflection winding in a manner to correct raster distortion.

3. A raster correction circuit according to claim 2 wherein said rectifying means and said impedance means are coupled in series with each other.

4. A raster correction circuit according to claim 3 wherein said active current conducting means is coupled in parallel with said series coupled rectifying and impedance means for providing a shunt path for current in said rectifying means.

5. A raster correction circuit according to claim 2 wherein said control means includes a waveshaping network for forming substantially parabolically shaped waveforms at said field frequency rate for causing said current in said rectifying means to vary in a parabolic manner.

6. A raster correction circuit according to claim 5 wherein said control means includes energy storage means coupled between said rectifying means and said waveshaping means for storing energy for supplying said field rate generator.

7. A raster correction circuit comprising:

a line frequency generator;

a line frequency deflection winding coupled to said line frequency generator;

a line frequency transformer coupled to said line frequency generator;

series connected rectifier means and inductance means coupled to a winding of said transformer;

series connected storage means and waveshaping means coupled to said rectifier means for storing rectified line frequency energy obtained therefrom;

a field deflection generator coupled to said storage means for obtaining operating current therefrom; and an active current conducting device coupled in shunt with said rectifier means and said inductance means and having a control electrode coupled to said waveshaping means and responsive to field rate signals developed therein for providing a varying impedance at said field rate for controlling the line rate current flow through said rectifier means for loading said transformer and thereby altering the line rate scanning current through said line frequency deflection winding at said field rate in a manner to correct for side pincushion distortion.

* * * * *